United States Patent [19]

Kaufman

[11] Patent Number: 4,549,445

[45] Date of Patent: Oct. 29, 1985

[54] YOKE THRUST BEARING FOR A PISTON AND CONNECTING ROD ASSEMBLY

[75] Inventor: Vernon R. Kaufman, Cedarburg, Wis.

[73] Assignee: Tecumseh Products Company, Tecumseh, Mich.

[21] Appl. No.: 560,531

[22] Filed: Dec. 12, 1983

[51] Int. Cl.[4] ............................................. F16J 7/00
[52] U.S. Cl. ............................. 74/579 R; 74/579 E; 74/44
[58] Field of Search ................ 74/579 R, 579 E, 44; 384/276, 294, 288, 429, 430; 403/150, 151, 152, 153, 154, 155

[56] References Cited

U.S. PATENT DOCUMENTS

| | | | |
|---|---|---|---|
| 951,181 | 3/1910 | Duffy | 74/579 X |
| 1,451,428 | 4/1923 | Lontz | 384/276 |
| 1,646,288 | 10/1927 | Graham | 74/579 X |
| 1,939,959 | 12/1933 | Dick | 403/154 X |
| 1,948,176 | 2/1934 | Hopkins et al. | 74/579 E |
| 2,628,136 | 2/1953 | Pittman | 74/579 X |
| 2,652,728 | 9/1953 | Kiekhaefer | 74/44 |
| 2,860,016 | 11/1958 | Swart | 403/155 X |
| 3,034,840 | 5/1962 | Gammon et al. | 384/276 X |
| 3,576,353 | 4/1971 | Barker | 74/579 E |
| 3,626,815 | 12/1971 | Fingeroot | 74/579 E |
| 4,333,404 | 6/1982 | Kleykamp | 384/276 X |
| 4,406,590 | 9/1983 | Kessler | 29/156.5 A |

Primary Examiner—Kenneth J. Dorner
Assistant Examiner—Rodney M. Lindsey
Attorney, Agent, or Firm—Albert L. Jeffers; Anthony Niewyk

[57] ABSTRACT

A piston and connecting rod assembly comprises a one-piece yoke thrust bearing disposed between the piston and connecting rod to provide bearing surfaces therebetween. The piston includes a pair of wrist pin bosses disposed therein and in spaced-apart facing relationship. The bosses have oppositely disposed faces with axially aligned bores therein, and the faces have disposed therein respective shoulder-like depressions. The yoke thrust bearing comprises a pair of washer portions in abutment against respective boss faces and interconnected by a yoke element, and the washer portions have respective projections conformably received in respective depressions, thereby aligning the holes in the washers with the bores and preventing rotation of the yoke thrust bearing in the piston. On end of the connecting rod is received between the washer portions, and a wrist pin is passed through the boss bores, washer portions, and the connecting rod opening to thereby pivotally connect the piston and connecting rod together. A method of assembling the piston, connecting rod, wrist pin, and yoke thrust bearing is provided.

8 Claims, 10 Drawing Figures

4,549,445

YOKE THRUST BEARING FOR A PISTON AND CONNECTING ROD ASSEMBLY

BACKGROUND OF THE INVENTION

This invention pertains to a piston and connecting rod assembly, and more particularly to an improved piston and connecting rod assembly for compressors and internal combustion engines, such as small two and four cycle engines, for example. A one-piece yoke thrust bearing is disposed between the piston and connecting rod to provide bearing surfaces therebetween.

In many engines, the connecting rod is guided either by shoulders on the crankshaft or by wrist pin bosses in the piston. Copending application Ser. No. 437,363 filed Oct. 25, 1982 discloses a prior art crankshaft and connecting rod assembly wherein the connecting rod is not guided on the crankshaft, and suitable bearings within the piston must be provided.

Current pistons for guiding the connecting rod in the piston generally comprise a pair of wrist pin bosses, wherein the bosses have oppositely disposed and spaced-apart faces, which have a smooth hard finish, and a pair of bores disposed through the respective bosses. One end of a connecting rod having an opening therethrough is disposed between the boss faces, and a washer is positioned between each face and one side of the connecting rod to provide bearing surfaces therebetween. A wrist pin is then passed through the boss bores, the two washers, and the opening in the connecting rod.

In assembling the above type piston and connecting rod assembly, one of the major difficulties is passing the wrist pin through the bores, both washers, and the connecting rod opening without displacing one of the washers out of axial alignment or dropping one of the washers out of the piston. This assembly is also quite time consuming since it requires the assembler to first align one of the washers with a bore, pass the wrist pin through the bore and through the washer, then insert the connecting rod and pass the pin through the connecting rod opening, and then align the second washer between the connecting rod and the other bore so that the wrist pin may then be passed therethrough. Clearly, multiple repetitions of this manual method of assembling will increase the likelihood of washers becoming displaced, dropped out of the piston, or possibly result in the assembling of the piston and connecting rod with only one washer.

Although the use of a stacking pin eliminates the necessity of individually aligning the washers and connecting rod with the wrist pin, it nevertheless is time consuming in that the operator must handle three items, i.e., two washers and the connecting rod, in assembling the piston and connecting rod together.

Further, most currently used washers are made of hardened and ground steel, and are therefore individually quite costly, and increase the overall cost of the engine.

SUMMARY OF THE INVENTION

The present invention overcomes the problems and disadvantages of the prior art by providing an improved piston and connecting rod assembly wherein a one-piece yoke thrust bearing is disposed between the boss faces and the connecting rod. The assembly of the present invention in one form thereof provides on the boss faces respective shoulder-like notches or depressions, and includes a one-piece yoke thrust bearing comprising a pair of washer portions interconnected by a yoke element. The washer portions have complementary shaped projections, which are received in respective depressions, thereby guiding the thrust bearing in place, providing self-alignment of the washer holes with the bores and preventing rotation of the yoke thrust bearing within the piston. Compared to assembling the two individual washers of the prior art assembly, the one-piece yoke thrust bearing can be easily and quickly installed in the piston, either manually or automatically, thereby providing a saving in time and expense.

Further, the one-piece yoke thrust bearing is made of partially hardened spring steel, and is therefore inexpensive compared to the two ground and hardened washers of current piston and connecting rod assemblies, thereby providing a further savings in cost.

The ends of the wrist pin are preferably rounded or chamfered to assist in aligning the holes.

In one form of the invention there is provided a piston and connecting rod assembly comprising a piston having a pair of wrist pin bosses, which have respective faces in spaced-apart and facing relationship with each other, and respective bores in axial alignment. One end of the connecting rod, which has an opening therein, is disposed between the faces so that the opening is in axial alignment with the bores. A one-piece bearing member has a pair of washer portions respectively disposed between the faces and the connecting rod end, and a yoke portion extends around the connecting rod one end and interconnects the washer portions.

The present invention also provides a method of assembling a piston and connecting rod, which has an opening in one end thereof, comprising the steps of providing a piston including a pair of wrist pin bosses having respective faces in spaced-apart and facing relationship with each other, the bosses having respective bores in axial alignment therein, and further providing a one-piece bearing member comprising a pair of washers interconnected by a yoke element, wherein the washers have respective holes in axial alignment with one another. The washers of the bearing member are inserted between the boss faces, and the holes in the washers are aligned with the bores in the boss face. Then, the one end of the connecting rod is positioned between the washers, and the opening in the one end is aligned with the boss bores and the washer holes. Thereafter, a wrist pin is passed through the aligned bores, holes, and opening.

It is an object of the present invention to provide an improved piston and connecting rod assembly.

Another object of the present invention is to provide a one-piece yoke thrust bearing disposed between the piston and connecting rod for providing bearing surfaces therebetween.

Yet another object of the present invention is to provide a piston and connecting rod assembly which is less expensive to manufacture than prior assemblies.

A further object of the present invention is to provide an improved method of assembling a piston and connecting rod together.

Yet still another further object of the present invention is to provide a method for easily and quickly assembling a piston and connecting rod together.

Further objects of the present invention will appear as the description proceeds.

BRIEF DESCRIPTION OF THE DRAWINGS

The above-mentioned and other features and objects of this invention, and the manner of attaining them, will become more apparent and the invention itself will be better understood by reference to the following description of a embodiment of the invention taken in conjunction with the accompanying drawings, wherein.

DESCRIPTION OF A PREFERRED EMBODIMENT

Figure 1:
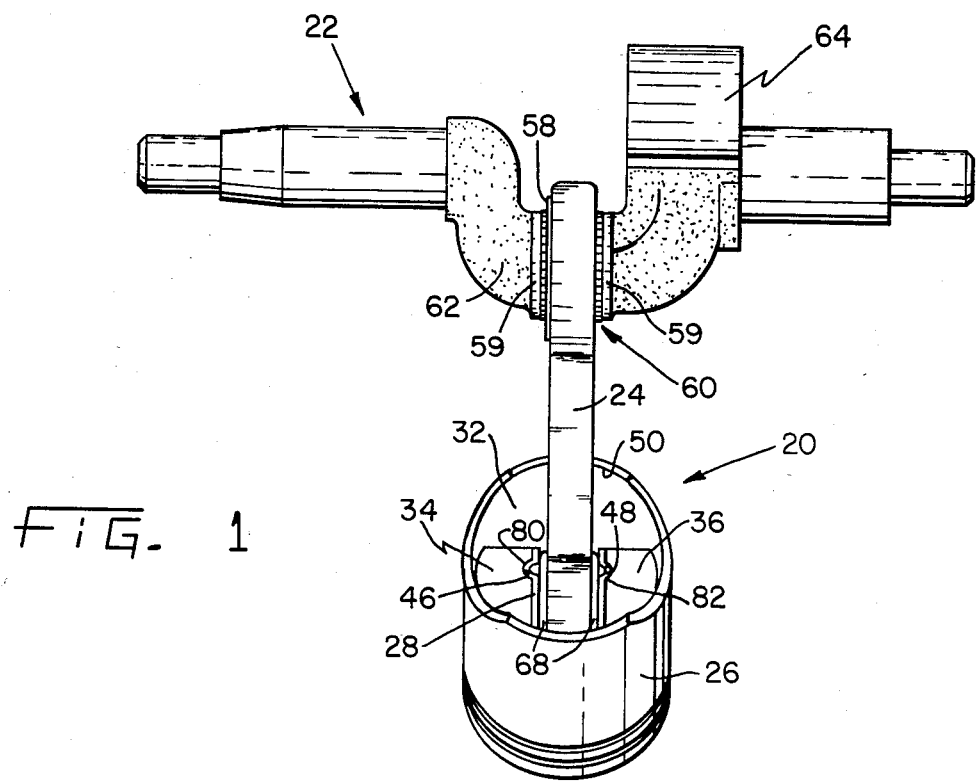
FIG. 1 is a perspective view of a preferred embodiment of the present invention connected to a crankshaft.

Referring to FIG. 1, piston and connecting rod assembly 20 of the present invention is illustrated with crankshaft 22 connected thereto. Piston and connecting rod assembly 20 generally comprises connecting rod 24, piston 26, one-piece yoke thrust bearing 28, and wrist pin 30 (FIG. 2).

Referring to FIGS. 1, 2, 6, and 7, piston 26 has a head 23, a skirt 25 with an inner surface 32 having a pair of wrist pin bosses 34,36 oppositely disposed thereon and having respective faces 38,40 in spaced-apart and facing relationship. Boss 34 has bore 42 therein and boss 36 has bore 44 therein, the bores 42,44 being in axial alignment with each other. Bosses 34,36 further include two shoulder-like slots or depressions 46,48 respectively disposed in faces 38,40. Depressions 46,48 are disposed in the remote end portions of respective faces 38,40 nearest opening 50 of piston 26 and extend to edges 47 (FIG. 7) of bosses 34 and 36 that face away from piston head 23.

Figure 2:
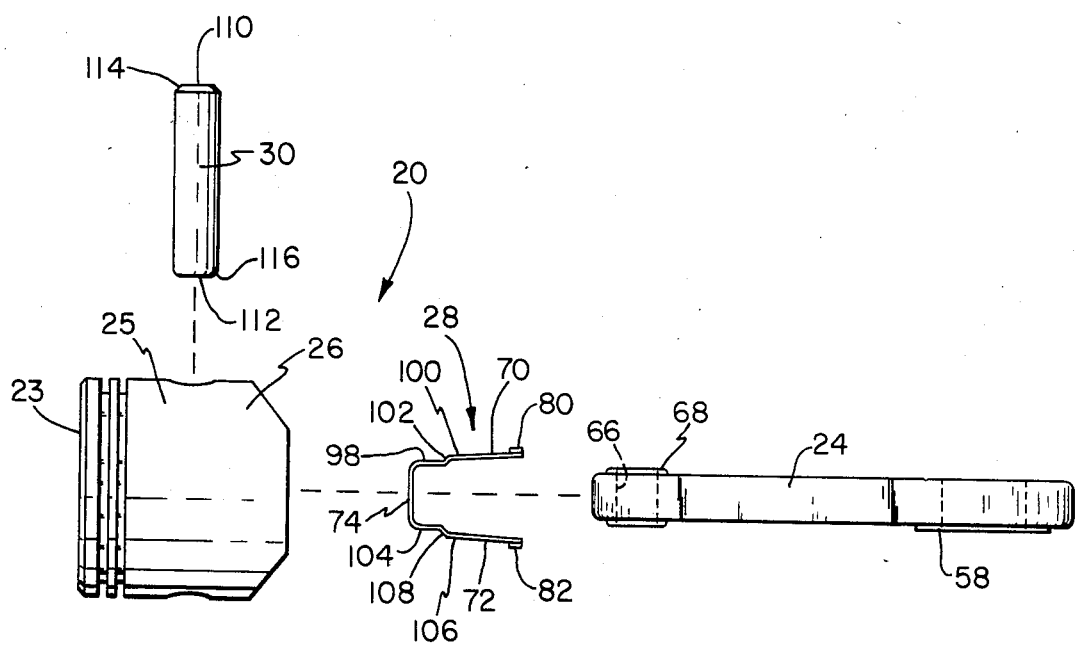
FIG. 2 is an exploded view of the embodiment of the present invention in FIG. 1.
Figure 10:
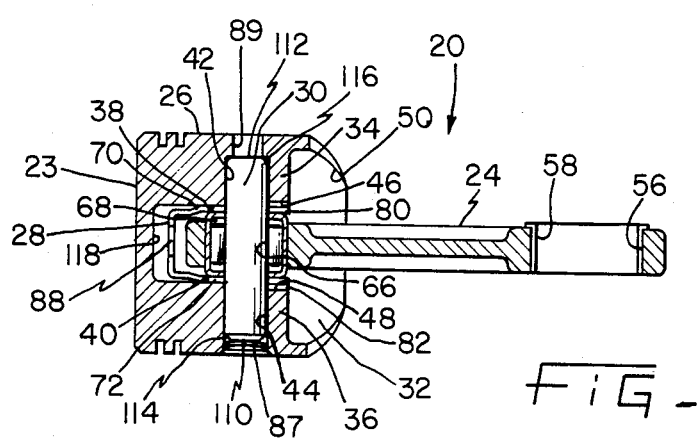
FIG. 10 is a sectional view of the assembled embodiment of the present invention.

Referring now to FIGS. 1, 2, and 10, connecting rod 24 has opening 56 in one end thereof with steel sleeve 58 secured therein, and is rotatably supported on bearing assembly 60 circumferentially disposed about crankshaft portion 62 between shoulders 59 and adjacent counterweight 64.

The opposite end of connecting rod 24 includes opening 66 with roller and sleeve bearing 68 disposed therein.

Referring to FIGS. 1-5, yoke thrust bearing 28 comprises a pair of spaced-apart washer portions 70,72 interconnected by yoke portion 74. Washer portions 70,72 have outwardly facing respective holes 76,78 disposed therein and in axial alignment. The remote ends of washer portions 70,72 have respective projections 80,82 disposed on their outwardly facing surfaces 84,86, respectively. Projections 80,82 are formed to be complementary to depressions 46, 48 in faces 38,40.

Yoke portion 74 comprises midportion 88 and two wider end portions 90,92 on opposite sides of midportion 88. Yoke portion 74 is preferably integrally joined to washer portions 70,72 at respective junctures 94,96.

Figure 3:
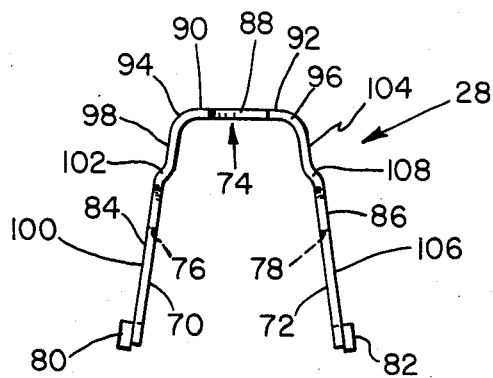
FIG. 3 is a front elevational view of the yoke thrust bearing of the embodiment.
Figure 5:
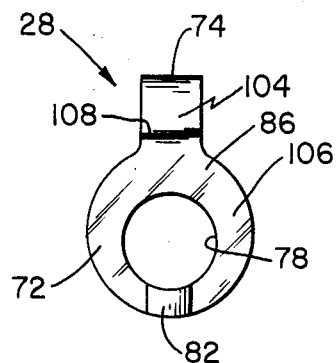
FIG. 5 is a side elevational view of the yoke thrust bearing.

As illustrated in FIG. 3, washer portion 70 includes a top segment 98 and a bottom segment 100, through which hole 76 is disposed. Segments 98,100 are outwardly disposed angularly from yoke element 74, and segments 98,100 are joined together at 102 such that bottom segment 100 is spaced outwardly from top segment 98, both segments 98 and 100 lying in parallel planes.

Figure 4:
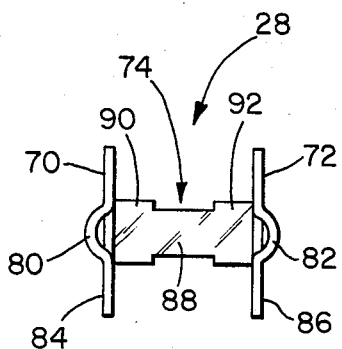
FIG. 4 is a bottom plan view of the yoke thrust bearing with the washer portions in the deflected position.
Figure 6:
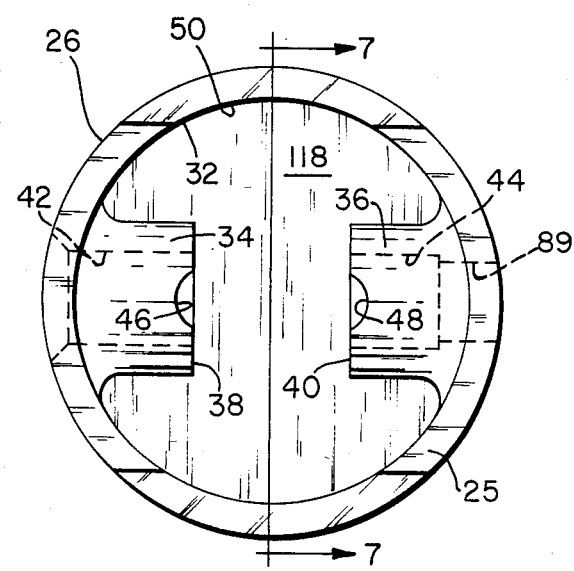
FIG. 6 is a bottom plan view of the piston of the embodiment.
Figure 7:
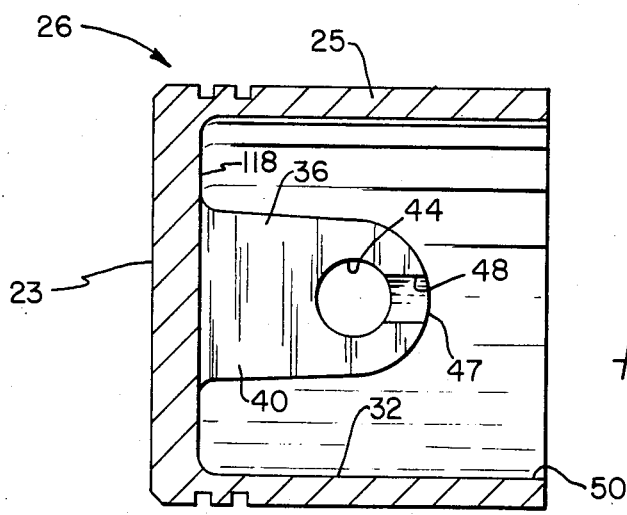
FIG. 7 is a sectional view of FIG. 6 taken along line 7—7 and viewed in the direction of the arrows.

In an identical manner, washer portion 72 includes top segment 104 and bottom segment 106 at 108, and segments 104,106 are outwardly disposed angularly in parallel planes from yoke element 74. It should be noted that FIG. 3 illustrates yoke thrust bearing 28 in a free state, i.e., washer portions 70,72 are in their normal state diverging from yoke element 74. In contrast, FIG. 4 illustrates yoke thrust bearing 28 in its inwardly deflected state when positioned between boss faces 38;40, as will be explained in detail below.

Figure 9:
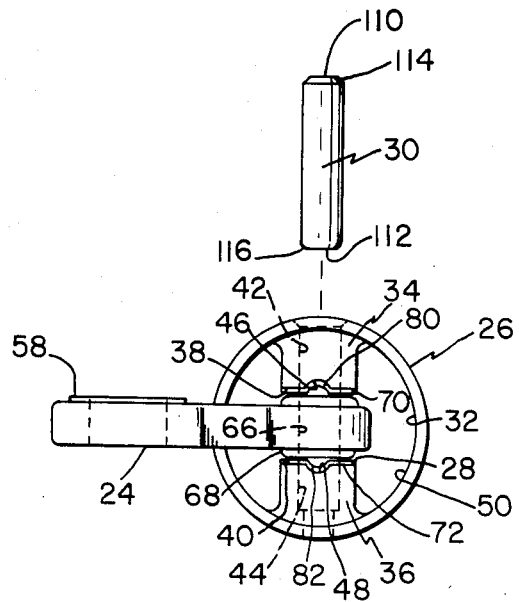
FIG. 9 is similar to FIG. 8 with the connecting rod inserted in the yoke thrust bearing and the wrist pin slightly spaced-apart from the piston.

FIGS. 2, 9, and 10 illustrate wrist pin 30 which is received through bores 42,44; holes 76,78; and opening 66. Wrist pin 30 is cylindrical in shape and has opposite ends 110, 112 having respective peripheries 114,116. To assist in passing wrist pin 30 through bores 42,44, holes 76,78, and opening 66, peripheries 114, 116 are shaped with chamfered surfaces or rounded surfaces to assist in assembly.

The method of easily and quickly assembling piston 26 and connecting rod 24 is illustrated primarily in FIGS. 2, 8, 9, and 10. FIG. 2 illustrates piston and connecting rod assembly 20 before assembly and includes connecting rod 24, piston 26, yoke thrust bearing 28, and wrist pin 30. The assembling of piston and connecting rod assembly 20 comprises inserting yoke thrust bearing 28 between bosses 34,36 by positioning yoke element 74 therebetween and deflecting washer portions 70,72 inwardly to permit them to slide against faces 38,40 until projections 80,82 are received in respective depressions 46,48. Depressions 46,48 are located in faces 38,40 such that holes 76,78 are in axial alignment with respective bores 42,44 when projections 80,82 are conformably received in depressions 46,48, respectively. Thus, depressions 46,48 and projections 80,82 serve to axially align holes 76,78 with bores 42,44, and further serve to lock yoke thrust bearing 28 against rotation. Further, surfaces 84,86 of respective washer portions 70,72 abut against respective faces 38,40, thereby providing bearing surfaces between bosses 34,36 and connecting rod 24.

Figure 8:
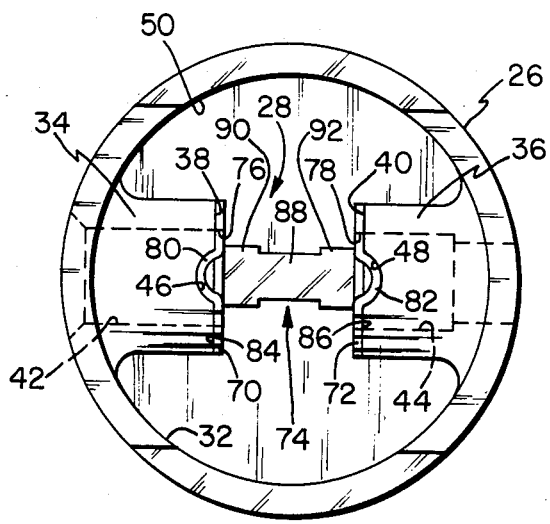
FIG. 8 is a bottom plan view of the piston with the yoke thrust bearing inserted therein.

FIG. 8 illustrates yoke thrust bearing 28 assembled in piston 26 in its inwardly deflected state. Referring now to FIG. 9, connecting rod 24 is then positioned between washer portions 70,72, and opening 66 is aligned with holes 76,78 and bores 42,44. Thereafter, wrist pin 30 is passed through bores, 42,44, holes 76,78, and opening 66, as illustrated in FIG. 10. A snap retainer 87 and shoulder 89 retain pin 30 in piston 26.

FIG. 10 further illustrates yoke element 74 spaced-apart from and intermediate connecting rod 24 and bottom surface 118 of piston 26. Further, a certain amount of tolerance is present between yoke thrust bearing 28 and connecting rod 24.

Yoke thrust bearing 28 is preferably made of 0.0285 to 0.0315 thick partially hardened spring steel of Bainite structure with a Rockwell C hardness of about 27 to 36, and has a scaleless tempered finish.

While this invention has been described in terms of a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. A piston and connecting rod assembly, comprising:
    a piston head having a pair of wrist pin bosses therein, said wrist pin bosses having respective faces in spaced-apart and facing relationship with each other and respective bores in axial alignment with each other, said faces each including a depression,
    a connecting rod having one end thereof disposed between said faces, said one end having an opening in axial alignment with both said bores,
    a wrist pin member in said bores and said opening to pivotally connect said connecting rod and said piston, and
    a one-piece bearing device comprising a pair of washer portions having apertures therein for receiving said wrist pin member and respectively disposed between said faces and said connecting rod one end, said washer portions abutting against respective ones of said faces and including respective projections, said projections being complementary with said depressions and received therein to prevent rotation of said bearing means around said wrist pin member, and a yoke portion extending around said connecting rod one end and interconnecting said washer portions.

2. The assembly of claim 1 wherein said wrist pin member has opposite ends, one of said ends having a rounded periphery to facilitate insertion in said bores, said opening of said connecting rod one end, and said washer portions.

3. The assembly of claim 1 wherein the depressions in said piston bosses comprise open slots in the faces thereof, said slots extending to surfaces of said bosses facing in a direction away from the piston head, the projections in said washer portions being disposed in said slots, said slots and projections interfitting to guide said bearing device into position and lock said bearing device against rotation about said wrist pin member.

4. The assembly of claim 1 wherein said bearing means is made of partially hardened spring steel material.

5. The assembly of claim 4 wherein said partially hardened spring steel material has a hardness of about 27 to 36 Rockwell C.

6. A piston and connecting rod assembly comprising:
    a piston head having a pair of wrist pin bosses therein, said wrist pin bosses having respective faces in spaced-apart and facing relationship with each other and respective bores in axial alignment with each other,
    a connecting rod having one end thereof disposed between said faces, said one end having an opening in axial alignment with both said bores,
    a wrist pin member inserted in said bores and said opening to pivotally connect said connecting rod and said piston,
    said boss faces having respective locking means thereon, said locking means comprising a pair of concave depressions in respective ones of said boss faces,
    a one-piece bearing device comprising a pair of washer portions respectively disposed between said faces and said connecting rod one end, said washer portions having respective engaging means thereon and aligned apertures therein for receiving said wrist pin member and abutting against respective ones of said faces said engaging means comprising a pair of complementary projections on respective ones of said washer portions, said respective projections engaging said respective depressions in locking engagement therewith to align said apertures with said bores and prevent rotation of said washer portions around said wrist pin, and a yoke portion extending around said connecting rod one end and interconnecting said washer portions.

7. The assembly of claim 6 wherein said bearing device is made of a spring steel material having an RC factor between about 27 to 36.

8. The assembly of claim 6 wherein said wrist pin member has opposite ends, one of said ends have an arcuately-shaped periphery to facilitate insertion of said wrist pin member in said bores, said opening, and said washer portions.

* * * * *